April 3, 1962　　　H. C. AMOS　　　3,027,622
EDGE PERFECTING TOOL
Filed Aug. 20, 1958
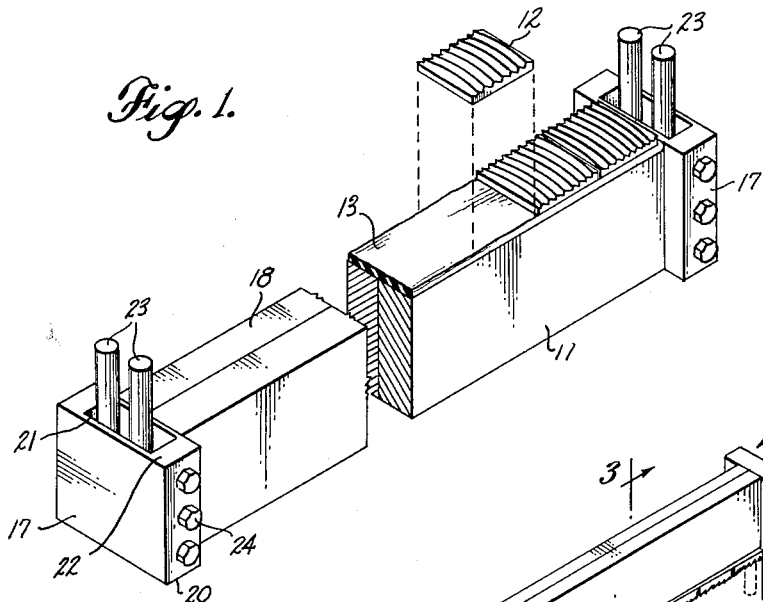
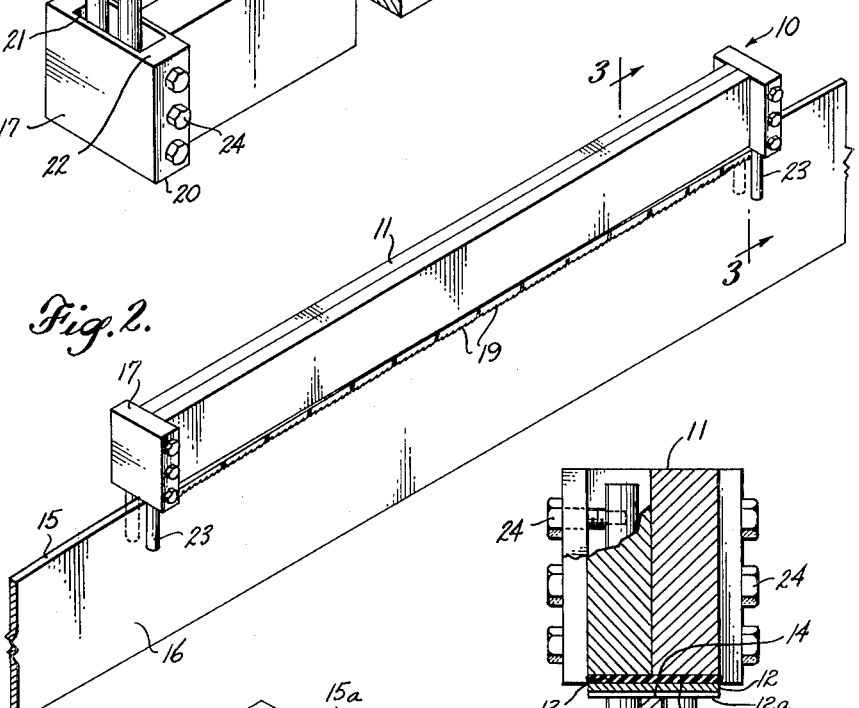
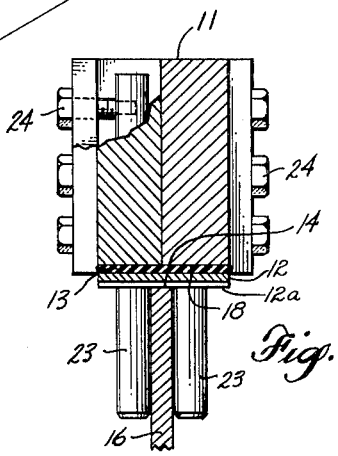
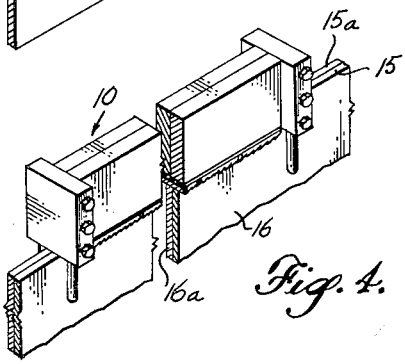
INVENTOR.
HOMER C. AMOS
BY Schroeder, Hofgren,
Brady + Wegner
ATTORNEYS

United States Patent Office 3,027,622
Patented Apr. 3, 1962

3,027,622
EDGE PERFECTING TOOL
Homer C. Amos, Palm Springs, Calif., assignor, by mesne assignments, to Philbrick-Strickland Laminates, Inc., a corporation of Washington
Filed Aug. 20, 1958, Ser. No. 756,186
2 Claims. (Cl. 29—78)

This invention relates to tools, and in particular to edge perfecting tools and methods of perfecting edges.

In forming profiles or templates, it is often necessary to provide highly accurate edge configurations. Where the profiles are relatively large, such accuracy has heretofore been extremely difficult to obtain. In providing an arc in such a profile edge by the conventional laying out, sawing and filing of the edge, an accuracy of plus or minus .01 inch may be obtained. The instant invention is concerned with a tool for perfecting the profile edge to a substantially greater degree of accuracy, such as to plus or minus .001 inch.

Thus, the principal object of this invention is to provide a new and improved edge perfecting tool.

Another object is to provide such a tool having edge shaping means adjustable to coincide exactly with a selected portion of the profile edge and means for releasably securing the edge shaping means in such coinciding arrangement.

A further object is to provide such a tool wherein the edge shaping means is carried by a thermoplastic means which, when heated permits the shaping means to adjust to the desired edge coinciding arrangement and, when cooled, maintains the shaping means in such arrangement.

A still further object is to provide a new and improved method of perfecting a profile edge wherein shaping means are moved in a new and improved manner along the edge.

A still further object is to provide such a method of perfecting a profile edge wherein a plurality of similar profiles are simultaneously and similarly perfected.

Other features and advantages of the invention will be apparent from the following description taken in connection with the accompanying drawing, wherein:

FIG. 1 is a broken perspective view of a tool embodying the invention, in an inverted position, and with a portion of the file chips thereof removed to facilitate the structural showing;

FIG. 2 is a perspective view of the tool associated with a portion of a profile plate as during an edge perfecting operation;

FIG. 3 is a transverse section thereof taken substantially along the line 3—3 of FIG. 2; and FIG. 4 is a perspective view of the tool associated with portions of a pair of profile plates as during an edge perfecting operation.

In the exemplary embodiment of the invention, as disclosed in the drawing, an edge perfecting tool generally designated 10 is shown to comprise an elongated support 11 to which is adjustably fixed a plurality of edge shaping elements 12. The means for fixing the elements 12 to the support 11 comprises a layer of thermoplastic material 13 which, when heated, permits the edge shaping elements 12 to be positioned in accurate coincidence with a selected portion 14 of the edge 15 of a profile plate, or template 16. To effect a desired alignment of the support 11, and the edge shaping elements carried thereby, relative to the profile plate during an edge perfecting operation, the support 11 is provided at its opposite ends with adjustable guides 17 arranged to straddle edge 15 and have a sliding fit with the opposite sides of the profile plate.

More specifically, support 11 comprises a pair of juxtaposed iron bars, each bar herein measuring approximately 1 inch by 3 inches by 30 inches. The support is sufficiently heavy to cause the edge shaping element 12 to bear against the profile plate edge 15 with a proper force permitting the use of only a translational force on the tool in effecting the edge perfecting operations.

As best seen in FIG. 3, the thermoplastic layer 13 is provided on the underside 18 of support 11. The thickness of the layer 13 is preselected to permit successive resetting of the element 12 on the support and, as shown in each of FIGS. 1, 3 and 4, herein is at least approximately the thickness of the file teeth 12a of the element 12. An example of an excellent material for use as layer 13 is tar which is readily softenable by the application of heat to permit the edge shaping elements 12 to be readily positioned thereon. When cooled, the tar fixedly retains the elements 12 in the adjusted positions.

Herein, edge shaping elements 12 comprise vixen type file chips which are set end to end in the tar layer 13 to define an extended edge shaping means 19 extending longitudinally along the underside 18 of support 11.

Each of guides 17 comprises a mounting block 20 secured to an end of support 11 and provided with a recess 21 opening through the bottom surface 22 of the block aligned with tar layer 13. A pair of guide rods 23 are disposed in recess 21 and extend outwardly therefrom a substantial distance. The rods 23 are adjustable laterally by means of a plurality of bolts 24 carried by block 20 and extending into recess 21 to have threaded engagement with the rods. Thus, as best seen in FIG. 3, rods 23 may be readily adjusted to have a snug, sliding fit on profile plate 16 and maintain a desired transverse alignment of the support 11 relative to the profile plate.

As best seen in FIG. 2, tool 10 is used to perfect the profile edge 15 by arranging the tool with file elements 19 resting on the edge 15. In illustrating the invention, it will be assumed that it is intended to make edge 15 a large diameter, true circular arc. A rough approximation to the desired circular arc is obtained by laying out, cutting as by sawing, and rough filing edge 15 to a circular arc configuration with an accuracy of approximately plus or minus .01 inch. The profile plate is then secured by suitable means (not shown) in a vertical disposition with edge 15 uppermost. Tool 10 is then placed over the profile plate with file elements 12 resting on edge 15. Rods 23 of guides 17 are adjusted to have snug sliding fit with the profile 16 on the opposite sides thereof.

Tar layer 13 is heated to permit the individual file elements 12 to reset themselves each in intimate engagement with the subjacent portion of edge 15 on which they rest. The tar layer is then allowed to cool, whereupon the file elements 12 are fixed to define the extended edge shaping means 19 coinciding exactly with the subjacent portion 14 of profile edge 15.

Tool 10 with file elements 12 fixed therein as described above, is now moved from one end of profile edge 15 to the other end, with file elements 12 perfecting edge 15 as they travel therealong. Tool 10 is then picked up, turned end for end, replaced on the profile plate, and moved back to the first end thereof. At the first end, the tool is again reversed end for end and several additional such cycles effected. The edge 15 is then inspected and the truest portion of the edge visually determined. To facilitate such a determination edge 15 may be previously blued. Tool 10 is now set on the selected truest section of edge 15 and layer 13 is again heated to permit the file elements 12 to reset themselves on the selected, more accurately true, portion of the profile plate edge. The tool is then moved along the edge as described above, and subsequently redeterminations of the resulting truest portions of the edge, resetting of the filing elements 12 by the proper heating and cooling of the tar layer 13, and subsequent series of edge perfecting movements are effected whereby edge 15 rapidly assumes a true arc configuration.

Turning now to FIG. 4, a method of concurrently perfecting a plurality of profile plate edges is illustrated. As shown, a pair of profile plates 16 and 16a are facially juxtaposed with their edges 15 and 15a respectively disposed uppermost and laterally juxtaposed. Tool 10 is placed over the juxtaposed plates similarly as described relative to the single plate 16 and guide rods 23 properly adjusted. The file elements 12 are caused, by suitable heating of tar layer 13, to set themselves in resting engagement on the subjacent portions of each of the edges 15 and 15a. As one of the edges may be slightly lower than the other at the subjacent portion due to an irregular dissimilarity in the two edge curvatures, the file elements may be slightly skewed to a plane perpendicular to the flat plane of the profile plates. When the tar layer 13 is cooled, this transverse angularity of the individual file elements is maintained. The tool is then moved from end to end of the paired edges 15 and 15a as in the perfecting of the single profile edge. A succession of cycles of moving of the tool along edges 15 and 15a, including turning the tool end for end at the opposite ends of the edges, and resetting the file elements on selected improved accurate edge portions, as described relative to the use of the tool with the single profile plate 16, is effected and the two edges 15 and 15a are rapidly similarly perfected.

While I have shown and described certain embodiments of the invention, it is to be understood that it is capable of many other modifications. Changes, therefore, in the construction and arrangement may be made without departing from the spirit and scope of the invention as defined in the appended claims.

I claim:

1. A tool for perfecting an irregular edge, comprising: a plurality of edge shaping elements each provided with a file surface and an opposite support surface having a large area; a rigid support; and a layer of selectively resettable material on the support fixing said elements to said support to define co-operatively successive ones of a plurality of extended shaping means, each shaping means coinciding exactly with a corresponding one of a series of successively changed configurations of a predetermined portion of the edge, said layer of material having a thickness preselected for effectively precluding engagement of said elements with the support notwithstanding such successive fixing of said elements to said support.

2. A tool for perfecting an irregular edge of a profile or the like, comprising: a plurality of edge shaping elements each provided with a file surface portion and an opposite support surface having a large area; a rigid support; a layer of selectively resettable material on the support fixing said elements to said support to define cooperatively successive ones of a plurality of extended shaping means, each shaping means coinciding exactly with a corresponding one of a series of successively changed configurations of a predetermined portion of the edge, said layer of material having a substantial thickness at least approximately the thickness of said file surface portion for effectively precluding engagement of said elements with the support notwithstanding such successive fixing of said elements to said support; a pair of elongated, laterally spaced guide rods at each end of the support; and adjustable means carried by the support and engaging the rods for adjusting the spacing therebetween to provide a snug, sliding fit of the profile therebetween with said edge shaping elements extending across the edge.

References Cited in the file of this patent

UNITED STATES PATENTS

| | | |
|---|---|---|
| 271,868 | Kistner | Feb. 6, 1883 |
| 771,739 | Murphy | Oct. 4, 1904 |
| 1,028,448 | Eastlund et al. | June 4, 1912 |
| 1,335,866 | Vorhauer | Apr. 6, 1920 |
| 1,651,181 | Bugbee et al. | Nov. 29, 1927 |
| 1,666,701 | Hill | Apr. 17, 1928 |
| 2,308,624 | Pouech | Jan. 19, 1943 |
| 2,450,817 | Sterling | Oct. 5, 1948 |
| 2,772,471 | Leng | Dec. 4, 1956 |
| 2,816,351 | Sauers | Dec. 17, 1957 |

FOREIGN PATENTS

| | | |
|---|---|---|
| 127,492 | Australia | Apr. 16, 1948 |

OTHER REFERENCES

Kennametal Catalog 49, May 1949 (page 66).

Designing With Kennametal, received May 23, 1956 (pages 20–24).

Severance Catalog No. 23, 1958 (page 15 and Bull. No. 2–CHF).